Patented June 22, 1954

2,681,921

UNITED STATES PATENT OFFICE 2,681,921

PREPARATION AND POLYMERIZATION OF DERIVATIVES OF ALPHA-HYDROXY ACIDS AND ESTOLIDES

Orville L. Polly and Orin D. Cunningham, Long Beach, Calif., assignors to Union Oil Company of California, Los Angeles, Calif., a corporation of California No Drawing. Application December 16, 1948, Serial No. 65,746

10 Claims. (Cl. 260—404)

This invention relates generally to methods for preparing derivatives of alpha-hydroxy acids and/or estolides, which derivatives are readily polymerized to useful resins and are separately useful as components of drying oils. More particularly, this invention relates to the reactions of alpha-hydroxy acids and/or estolides with unsaturated amines, alcohols and thio-alcohols and to the uses of the reaction products obtained thereby.

New methods for oxidizing paraffinic waxes and for fractionating and refining the oxidized waxes obtained thereby are disclosed in our copending application, Serial No. 21,846, filed April 19, 1948, by which methods high yields of relatively pure alpha-hydroxy acids and estolides are produced. The conditions for converting alpha-hydroxy acids into their estolides as well as the conditions for converting estolides back to alpha-hydroxy acids are disclosed therein. Methods for esterifying alpha-hydroxy acids and/or estolides with either monohydric or polyhydric alcohols were disclosed by which methods the course of the reaction can be directed to the normal, undehydroxylated, esters of alpha-hydroxyacids or of estolides or alternatively to the esters of dehydroxylated estolides wherein the hydroxyl group of the estolide has been replaced by an ethylenic bond which is in the alpha-beta position with respect to the ester linkage of the estolide.

As described in our copending application, drying oils may be prepared from the alpha-hydroxy acids and/or estolides which are obtained from wax oxidation by esterification with a polyhydric alcohol and simultaneously or subsequently dehydroxylating to produce high molecular weight esters of unsaturated or dehydroxylated estolides. The unsaturated linkage of the ester component is in the alpha-beta position with respect to the ester linkage of the estolide component and is susceptible to polymerization with the corresponding unsaturated linkages of other dehydroxylated estolidic components. Although satisfactory drying oil blending agents can be prepared by this method, control of the reaction to give the desired degree of unsaturation prior to the formation of a solvent-insoluble gel is somewhat difficult. Various non-gelation agents, notably rosin and styrene, have been employed successfully to delay gelation in order to extend the degree of dehydroxylation.

It has now been found that the reaction products of alpha-hydroxy acids and/or estolides and/or dehydroxylated derivatives thereof with unsaturated amines, alcohols or thio-alcohols are also useful as drying oils and are more easily prepared in an aromatic hydrocarbon solvent-soluble form than are the esters derived from the polyhydric alcohols. The monomeric unsaturated reaction products contain two isolated unsaturated linkages. The polymerization or drying of one or both unsaturated linkages is readily effected by heating to between about 170° C. and 300° C. or by heating to between about 150° C. to 250° C. in the presence of polymerization catalysts. Alternatively, the products can be dried in the manner of linseed oil by the use of drying catalysts, e. g., cobalt naphthenate. The relatively low molecular weight unsaturated reaction products are soluble in aromatic solvents and may be employed as concentrate in such solvents.

It is an object of this invention to react alpha-hydroxy acids and/or estolides with unsaturated amines, alcohols or thio-alcohols to produce reaction products which have useful drying properties and which can alternatively be used for forming coatings for metal articles and for the manufacture of linoleum compositions.

It is another object of this invention to esterify alpha-hydroxy acids and/or estolides with unsaturated alcohols or thio-alcohols under conditions which cause the simultaneous dehydroxylation of the estolides.

It is another object of this invention to prepare amides of unsaturated amines with alpha-hydroxy acids, estolides or dehydroxylated estolides whereby polymerizable products are obtained which have drying properties and are soluble in paint solvents.

It is another object of this invention to prepare reaction products of alpha-hydroxy acids, estolides or dehydroxylated estolides with unsaturated amines, alcohols or thio-alcohols and to effect the polymerization of such reaction products in the presence of polymerization catalysts such as organic peroxides and organic hydroperoxides.

It is another object of this invention to produce reaction products of alpha-hydroxy acids, estolides and/or dehydroxylated estolides with unsaturated amines, alcohols or thio-alcohols and to cause such reaction products to dry in the presence of drying catalysts.

It is another object of this invention to prepare polymerizable derivatives by reacting alpha-hydroxy acids, estolides and/or dehydroxylated estolides with amides, esters and thio-esters such as may be formed by reacting unsaturated amines, alcohols and thio-alcohols, respectively, with lower molecular weight fatty acids.

It is another object of this invention to react esters of alpha-hydroxy acids, estolides and/or dehydroxylated derivatives of esters of alpha-hydroxy acids and estolides with unsaturated amines, alcohols and thio-alcohols whereby polymerizable derivatives are produced.

Briefly, this invention comprises methods for reacting certain unsaturated reacting agents such as unsaturated amines, alcohols or thio-alcohols with a carboxylic acid selected from the class consisting of alpha-hydroxy acids, estolides, dehydroxylated alpha-hydroxy acids, and dehydroxylated estolides whereby polymerizable derivatives are produced, and the uses of such polymerizable derivatives for coating surfaces and in paint preparations. In the preferred modification of the invention a mixture of alpha-hydroxy acids and estolides is separated from the oxidized product obtained from the controlled oxidation of a refined paraffin wax which mixture is then reacted under controlled conditions with the unsaturated reacting agent to produce the polymerizable derivative. Alternatively, the mixture of alpha hydroxy acids and estolides isolated from the oxidized wax is separately treated to convert it to substantially pure alpha-hydroxy acids, or to estolides, or to dehydroxylated estolides, each of which is then reacted with the unsaturated reacting agent to form a polymerizable derivative. The polymerizable derivatives prepared according to this invention can be polymerized by thermal treatment such as by heating to between about 170° C. and 300° C. or by heating to temperatures between 150° C. and 250° C. in the presence of a catalyst such as certain organic peroxides and hydroperoxides. Alternatively, the polymerizable materials may be employed in drying compositions wherein they are mixed with appropriate quantities of drying catalysts such as cobalt naphthenate and exposed to the drying action of air.

The preferred alpha-hydroxy acids and/or estolides for the preparation of components for linoleum cements and drying oils according to the process of this invention are those which are prepared by the oxidation of wax and isolated therefrom according to the methods described hereinafter and also disclosed in our copending application referred to hereinbefore. These alpha-hydroxy acids obtained from the oxidation of paraffin waxes range mostly from approximately 5 to 30 carbon atoms per molecule while the estolides obtained thereby range from approximately 10 to 60 carbon atoms per molecule, depending to some extent upon the molecular weight of the oxidation feed stock.

The paraffin waxes which are most suitable for the preparation of alpha-hydroxy acids and estolides are those which are essentially mixtures of straight chain normal paraffins containing between 15 and 50 carbon atoms per molecule or more and preferably between about 20 and 35 carbon atoms per molecule. The wax is preferably a higher melting wax such as those refined waxes which melt above 90° F. and preferably above 120° F. A very suitable wax for the production of alpha-hydroxy acids and estolides is one which has been prepared by modern solvent refining technique. According to such methods a wax-containing topped residuum is extracted with liquefied propane to separate the asphalt and the thus deasphalted oil in propane solution is subsequently dewaxed by chilling to temperatures in the neighborhood of 40° F. to crystallize the wax which is then separated from the propane oil solution. The precipitated wax containing some oil is deoiled by dissolving it in a solvent such as methyl ethyl ketone and chilling to precipitate a deoiled wax. Such methods are well known and are generally described in U.S. Patent No. 2,229,658. The wax obtained by this or other solvent refining processes is relatively free of objectionable materials for wax oxidation purposes.

The oxidation of the paraffin wax is carried out in the liquid phase by blowing the melted wax with gas containing free oxygen until the desired acid number has been attained. The yield of alpha-hydroxy acids and estolides obtained by the oxidation of wax is closely dependent upon the temperature of the oxidation. High temperatures promote the decomposition of the alpha-hydroxy acids and estolides into a mixture of less desirable products and from which the alpha-hydroxy acids and estolides are less readily separated in pure form. The oxidation is preferably carried out at a temperature above the melting point of the wax and below 140° C. The preferred temperature range is from 100° C. to 130° C. and it is in this temperature range that the greatest yield of the more easily refined alpha-hydroxy acids and estolides is obtained.

The concentration of alpha-hydroxy acids and estolides in the oxidized wax as well as the yield of these compounds per unit weight of wax is closely dependent upon the acid number to which the wax is oxidized. A high yield of easily refined alpha-hydroxy acids and estolides is obtained when the oxidation of the wax is continued until the acid number is between 200 and 250 and preferably in the range of about 210 to 240. However, it is possible to oxidize the wax to a lesser degree, such as to an acid number between 150 and 200 and still recover practical quantities of the desired products.

In the preferred method for isolating the alpha-hydroxy acids and estolides from the oxidized wax, the oxidized wax is preferably washed with hot water for the purpose of separating water-soluble components from the water-insoluble components. The water washing process is preferably conducted at or near the boiling point of water, at which temperatures the oxidized wax is fluid. The water-insoluble, water washed fraction contains the desired alpha-hydroxy acids and estolides along with appreciable amounts of fatty acids and neutral compounds such as esters. The water-insoluble fraction is then washed with a non-polar solvent which is preferably a low boiling hydrocarbon such as naphtha, petroleum ether and the like. The extraction serves to dissolve most of the fatty acids and neutral oil from the hydrocarbon-insoluble alpha-hydroxy acids and estolides. Alternatively, the separation of the alpha-hydroxy acids from the fatty acids and neutral oils can be expedited by treating the water-washed oxidized wax with a concentrated solution of an alkali metal borate such as sodium borate with which salt the alpha-hydroxy acids and estolides form a complex thereby solubilizing them in the aqueous phase and extracting the resulting mixture with a hydrocarbon solvent. The solubility of the remaining neutral and acidic constituents in the hydrocarbon solvent is relatively unaffected by the presence of the sodium borate and a sharp separation of the two groups of compounds is obtained. The alpha-hydroxy acids and estolides are recovered as an oil phase by acidification of the borate-containing aqueous phase. The alternative borate refining method yields products ranging up to about 97% purity as contrasted to products of about 85% purity obtained by other methods.

The mixture of alpha-hydroxy acids and estolides obtained by the oxidation of paraffinic wax according to these methods comprises about 30% alpha-hydroxy acids and about 70% estolides on a neutral oil-fatty acid-free basis. This mixture or similar mixtures can be treated to effect conversion of the alpha-hydroxy acid content to estolides by heating the mixture to a temperature in the range of 100 to 150° C. in the absence of a catalyst or to a temperature of about 60 to 100° C. in the presence of a suitable acid catalyst according to the method described hereinafter. Similarly, estolides are convertible to their respective alpha-hydroxy acids by a process of alkaline saponification or with sodium hydroxide and careful acidification of the saponified mixture in order to prevent intimate contact of the liberated alpha-hydroxy phase during the acidification with a strong mineral acid such as sulfuric acid being added to effect the acidification. Alpha-hydroxy acids are converted to a mixture of estolides and alpha-hydroxy acids by contact with such strong mineral acids.

During the reaction of an unsaturated reacting agent, such as an unsaturated amine, alcohol, thio-alcohol or derivatives thereof with alpha-hydroxy acids and/or estolides and/or dehydroxylated estolides according to the method of this invention, four reactions may occur: singly, simultaneously, or consecutively, as determined by the choice of reaction conditions. These four reactions are termed estolide formation, reaction with the unsaturated reacting agent, dehydroxylation and polymerization, respectively. The temperature ranges discussed hereinafter in connection with each of the separate reactions are the minimum for effecting the individual reaction while preventing other reactions which require a higher minimum temperature.

Estolide formation relates to the inter-esterification between two molecules of alpha-hydroxy acid whereby the estolide is formed. This reaction takes place rapidly in the general temperature range of about 100 to 150° C. or higher and in the absence of a catalyst or alternatively in the temperature range of about 60 to 100° C. or higher in the presence of a catalyst of the types described hereinafter. Catalysts which are particularly active for this reaction include such acids as benzene sulfonic, toluene sulfonic, naphthalene sulfonic, sulfuric, chlorosulfonic, boric, phosphoric, and the like. The reaction is promoted by the presence of aromatic hydrocarbon solvents such as benzene, toluene, xylene and the like. The removal of water from the reaction mixture is desirable in order to complete the reaction. Estolide formation is reversible only by saponification of the estolide and careful acidification of the saponified mixture to free the acids and prevent reformation of the estolide. Although the acid catalysts mentioned hereinbefore are the preferred catalysts for estolide formation, other catalysts which are neutral or alkaline in nature such as alumina, silica gel, sodium methylate, sodium oleate, pyridine and the like may also be employed.

The reaction of the unsaturated reacting agent with an alpha-hydroxy acid, estolide or dehydroxylated estolide takes place under substantially the same reaction conditions and preferably in the presence of the same solvents as have been described hereinbefore for estolide formation. The reaction temperatures in the presence or absence of a catalyst correspond to those temperatures described hereinbefore for estolide formation in the presence or absence of a catalyst, respectively. Higher reaction temperatures are sometimes required for certain agents, particularly for the unsaturated amines. Those catalysts which have been described hereinbefore as effective estolide-forming catalysts are also active for promoting the reaction of the unsaturated reacting agent with the carboxyl compounds described hereinbefore.

In the case of the unsaturated amines, the reaction product with the carboxyl compound such as alpha-hydroxy acids, estolides or dehydroxylated estolides comprises a N-substituted amide wherein the substitution radical of the amide is an alkyl or alkyl-aryl radical having at least one polymerizable ethylenic or acetylenic bond. The N-substituted amide may be an amide of an alpha-hydroxy acid and estolide or a dehydroxylated estolide depending upon the starting materials and, more particularly, upon the reaction conditions. All such amides are polymerizable to useful derivatives. In general, the reaction conditions employed are such that appreciable amounts of the N-substituted amides of the dehydroxylated estolide are formed. In the case of the reaction of unsaturated alcohols and thio-alcohols with alpha-hydroxy acids, estolides and/or dehydroxylated estolides, there are produced esters and thio-esters respectively of alpha-hydroxy acids, estolides and dehydroxylated estolides. In general, conditions are so chosen that an appreciable part of the polymerizable derivatives comprises the ester or thio-ester of the unsaturated alcohol or unsaturated thio-alcohol with the unsaturated estolide.

The dehydroxlation reaction refers to the intramolecular dehydration of estolides or esters of estolides wherein the hydroxyl group alpha to the ester linkage of the estolide component is removed with the formation of an unsaturated bond which is alpha-beta with respect to the ester linkage of the estolide component and a dehydroxylated estolide or ester thereby is formed. The reaction is relatively slow compared to estolide-forming and esterification reactions and requires a higher temperature. In the absence of a catalyst the dehydroxylation reaction occurs in the temperature range of about 150 to 200° C. or higher, and in the presence of a catalyst in the temperature range of about 100 to 150° C. or higher. Catalysts which promote estolide formation and esterification similarly promote dehydroxylation. The reaction is likewise favored by the presence of a solvent and suitable solvents include the aromatic solvents which have been mentioned hereinbefore.

Polymerization refers collectively to the polymerization of the unsaturated linkages formed by the dehydroxylation of estolides or esters of estolides and also to the polymerization of the unsaturated linkage introduced into the molecule by the unsaturated amine, alcohol or thio-alcohol. Polymerization may take place between corresponding or non-corresponding unsaturated linkages. In the absence of a catalyst polymerization takes place at temperatures between about 170° C. and 300° C. and in the presence of a catalyst between about 150° C. and 250° C. depending upon the nature of the catalyst. Catalysts which are mildly active for promoting polymerization include the acid catalysts which have been disclosed hereinbefore for the other three reactions. The more effective catalysts for the polymerization include organic peroxides, organic hydroperoxides and the like. Particularly effective are benzoyl peroxide, cumene hydroperoxides, tertiary butyl hydroperoxide and dimethyl cyclopentyl hydroperoxides. Such polymerization catalysts are generally employed and are particularly active in the amount of about 0.001 to 1% by weight based on the polymer to be produced.

The term "unsaturated reacting agent" for the purpose of this invention is used to denote compounds having a structure corresponding to the formula

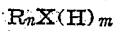

$$R_nX(H)_m$$

wherein R is an unsaturated hydrocarbon radical, X is a nitrogen, oxygen or sulfur atom, H is a hydrogen atom, and $n$ and $m$ are the integers 1 or 2 wherein the sum of $n$ and $m$ is equal to the valence of X. R may be an alkenyl-aryl, alkynyl aryl, aryl-alkenyl or aryl-alkynyl radical wherein the unsaturation of the aliphatic chain is not adjacent to the X atom. R may contain more than one olefinic or acetylenic linkage as in dieneyl radicals. When X is nitrogen and $n$ equals 2, R may be two identical unsaturated hydrocarbon radicals or these radicals may be different. Moreover, when $n$ is 2, R may be a divalent, unsaturated hydrocarbon radical. The R group or groups should contain between 3 and 20 carbon atoms and preferably between about 3 and 10 carbon atoms.

The unsaturated reacting agents which may be employed in this invention include those unsaturated amines, alcohols and thio-alcohols which contain one or more ethylenic or acetylenic bonds in the molecule and where the polymerization of such ethylenic or acetylenic bond is not restricted by steric hindrance. The unsaturated amine, alcohol or thio-alcohol may be either an aliphatic or aromatic compound. In general, it is desirable to employ reacting agents which contain between about 3 and 20 carbon atoms per molecule and preferably between about 3 and 10 carbon atoms per molecule. Although unsaturated reacting agents containing either acetylenic or ethylenic linkages may be employed, it is preferable to employ those agents containing ethylenic linkages. Among acetylenic amines, alcohols and mercaptans it is preferred to employ those compounds wherein the acetylenic linkage is not a terminal linkage on the chain as contrasted to those compounds which are aminated, hydroxylated or thio-hydroxylated alkyne-1's or aryl-alkyne-1's. In such compounds the active hydrogen attached to the acetylenic linkage results in the formation of unstable explosive compounds with certain metals under certain conditions and these compounds are of relatively limited use in this invention. Where it is desired to employ compounds containing two unsaturated linkages it is preferable to employ those compounds wherein the unsaturation is not of the conjugated 1,3-type wherein resonance can occur.

Suitable unsaturated amines which may be employed in this invention include allyl amine, crotyl amine, 4-(ortho amino phenyl) butene-2, 3-amino butene-1, 1,2,3,6-tetrahydro pyridine, 4-amino-4-phenyl butene-1, para-amino styrene and the like. Suitable unsaturated alcohols which may be employed in this invention include allyl alcohol, crotyl alcohol, geraniol, linalool, propargyl alcohol, 5-hydroxy pentyne-2, 5-hydroxy pentene-2, para-hydroxy styrene and the like. Suitable unsaturated mercaptans which may be employed in this invention include allyl mercaptan, crotyl mercaptan, 5-mercapto-pentyne-2, 5-mercapto-pentene-2, 4-para mercapto phenyl butene-1, 4-(para-mercapto phenyl) butyne-2, ortho vinyl thiophenol and the like.

In the preferred method for preparing unsaturated derivatives of alpha-hydroxy acids and/or estolides according to the process of this invention the alpha-hydroxy acids and/or estolide is mixed with a reacting agent of the type described hereinbefore and the mixture is heated to a temperature in the range of about 150 to 200° C. and preferably in the presence of an aromatic hydrocarbon solvent. At these temperatures the alpha-hydroxy acids are, in part, converted to their estolides and the estolides are simultaneously dehydroxylated and reacted with the added agents. About 1 to 50 hours are generally required for the reaction. Some dehydroxylation and reaction of the added agent with the alpha-hydroxy acids themselves also takes place. Extensive polymerization of the unsaturated ethylenic linkage formed by the dehydroxylation or originally present in the added agent is minimized by this choice of conditions. The reaction mixture is maintained at a temperature of about 100 to 200° C. under a suitable pressure to maintain the added agent in a liquid phase for a period of time sufficient to complete the reaction to the desired extent. In general, the reaction of the added agent with the estolides and dehydroxylated estolides is carried to about 50 to 75% completion as is determined by the amount of water liberated or by the disappearance of free carboxyl groups or both and the reaction is then stopped. If desired, the reaction may be carried further but considerable polymerization of the unsaturated linkages generally occurs and in many cases tends to separate a polymer from the mixture. Heating for about 1 to 50 hours is generally sufficient to produce the desired results.

In certain cases it is desirable to employ about 0.1 to 5% by weight of a dehydroxylation catalyst such as has been described hereinbefore in the mixture undergoing reaction whereby the reaction temperature can be lowered to the range of about 100 to 150° C. to complete the reaction to the desired degree. The use of higher temperatures in the presence of a catalyst tends to produce premature polymerization and some darkening of the products, which is undesirable.

In another modification of this invention the alpha-hydroxy acids and/or estolides are first reacted in the absence of the unsaturated reacting agent to convert the alpha-hydroxy acids to estolides and to dehydroxylate estolides. The alpha-hydroxy acids and/or estolides are heated in the absence of a catalyst to a temperature in the range of about 150 to 200° C. and preferably in the presence of an aromatic hydrocarbon solvent. If desired, about 0.1 to 5.0% by weight of an estolide-forming dehydroxylation catalyst may be employed in which case the reaction temperature is lowered to a range of about 100 to 150° C. The course of the reaction can be followed from titration data and the amount of water liberated by the reaction and the reaction may be carried to any desired extent of completion such as from 50 to 100 per cent of completion. Following the formation of the dehydroxylated estolides the desired unsaturated reaction agent is added to the mixture and the temperature is maintained in the range of about 100 to 200° C. for a period of time to react the unsaturated reacting agent with about 50 to 75% or more of the estolides and unsaturated estolides. About 1 to 50 hours of reaction is generally required. A suitable pressure is employed to maintain the bulk of the reactants in the liquid phase. The reaction can be carried to completion if desired but premature polymerization usually occurs which often results in the separation of a solid polymer from the reaction mixture. If desired, about 0.1 to 5.0% by weight of a dehydroxylation catalyst may be added which, in addition, serves to catalyze the reaction of the alpha-hydroxy acids, estolides and dehydroxylated estolides with the unsaturated reaction agent. If such a catalyst is added or is present from the dehydroxylation step the reaction temperature is controlled in the range of about 60 to 150° C. to effect the reaction with the unsaturated reacting agent.

In still another modification of this invention the mixture of alpha-hydroxy acids and/or estolides is first reacted with the unsaturated reacting agent to form reaction products and also to convert some alpha-hydroxy acids to estolides. These reactions may be effected by heating the mixture of alpha-hydroxy acids and/or estolides with the added agent and preferably in the presence of an aromatic hydracarbon solvent to a temperature in the range of 100 to 150° C. in the absence of a catalyst, or to between 60 to 100° C. in the presence of about 0.1 to 5.0% by weight of a catalyst and to complete the reaction with the added agent to any desired extent. Following at least the partial completion of these reactions the resulting mixture is heated to and maintained in the neighborhood of about 150 to 200° C. in the absence of a catalyst or to about 100 to 150° C. in the presence of a catalyst for a period of time to effect reaction with the unsaturated reacting agent. The reaction may be completed to any desired extent such as from 50 to 75% in about 1 to 50 hours. Suitable pressure is employed to maintain the bulk of the reactants in the liquid phase.

In still other modifications of the invention the alpha-hydroxy acid-estolide mixture obtained from the wax is reacted directly with the unsaturated reacting agent or, alternatively, the mixture is processed as described hereinbefore to prepare an enriched alpha-hydroxy acid or enriched estolide fraction which is then reacted with the unsaturated reacting agent. Any of these separate products can be polymerized either before or after dehydroxylation as described hereinbefore.

In preparing esterified derivatives of alpha-hydroxy acids and/or estolides it is preferable to employ approximately the stoichiometrically equivalent amount of unsaturated amine, alcohol or thio-alcohol which is required to react with the mixture of estolides and dehydroxylated estolides, assuming that the alpha-hydroxy acid content is completely converted to estolides during the reaction sequence and that one mole of the unsaturated amine, alcohol, or thio-alcohol is required for each mol of estolide or dehydroxylated estolide. Although it is preferable to use the aforementioned stoichiometric equivalent, we may also employ amounts of unsaturated reacting agents which range from about 1.0 to 2.0 times the aforedescribed theoretical amount.

In each of the foregoing applications of this invention non-gelation agents may be employed to delay gelation of the reaction mixture and complete the dehydroxylation reaction to a greater degree prior to gelation. In such cases the non-gelation agent is added to the mixture at any time prior to dehydroxylation. One group of non-gelation agents comprises those organic acids which contain a conjugated diene grouping and includes linoleic acid, linolenic acid, acrylic acid, methacrylic acid, abietic acid and the like. Such acidic non-gelation agents tend to react with the unsaturated reacting agents, viz., unsaturated amines, alcohols and thio-alcohols to form amides, esters, and thio-esters, respectively. The members of the second group of non-gelation agents are non-acidic in nature. This latter group includes turpentine, styrene, alpha-methyl styrene, isoprene, butadiene, pentadiene, cyclopentadiene, esters of linoleic acid, esters of linolenic acid, esters of abietic acid, esters of acrylic acid, esters of methacrylic acid, acrylonitrile and the like. Acidic non-gelation agents are employed in an amount between about 0.05 to 0.5, and preferably between about 0.1 and 0.3 moles of added agent per mole of alpha-hydroxy acid and/or estolide. When the non-gelation agent is selected from the acidic group, an additional amount of the unsaturated reacting agent is preferably employed which is roughly the stoichiometrical equivalent of the amount of carboxyl group present in the non-gelation agent. Non-acidic gelation agents may be employed in amounts ranging between 0.05 and 5 moles of agent, and preferably between about 0.1 and 0.6 mole of agent per mole of alpha-hydroxy acid and/or estolide. In general no additional amounts of unsaturated reacting agent are employed when the non-gelation agent is non-acidic.

It is often desirable to prepare polymerizable derivatives which are substantially free of unreacted carboxyl groups. The complete reaction of an unsaturated reacting agent with the available carboxyl groups is often difficult to effect without incurring premature polymerization of the product and the consequent decrease of the solubility of the product in common solvents. It has been found that the desired carboxyl-free derivatives can be prepared by first esterifying the alpha-hydroxy acids, estolides and/or dehydroxylated estolides with a low molecular weight alcohol, which reaction is readily carried to completion to form esters of alpha-hydroxy acids, estolides and/or dehydroxylated estolides. The completely esterified product is then subjected to an exchange reaction with the desired unsaturated amine, alcohol, or thio-alcohol wherein the desired polymerizable derivative is formed with the liberation of the low molecular weight alcohol. The low molecular weight alcohol is removed by fractionation and is re-employed in a cyclic process with appropriate makeup. Since during the exchange reaction there is always an insignificant concentration of free carboxyl groups, the reaction may be stopped at any desired time to yield a carboxyl group-free product. The preliminary esterification may be effected with any lower molecular weight aliphatic alcohol such as methyl, ethyl, propyl or butyl alcohols. If desired, the exchange reaction can be catalyzed by various acidic, neutral and alkaline catalysts such as alkyl and aryl sulfonic acids, sodium and potassium hydroxides, sodium and potassium soaps, alkali metal methylates, nitrogen bases and the like. The exchange reaction is preferably effected by heating the ester with the unsaturated reacting agent to a temperature of about 100 to 250° C. under suitable pressure to maintain the reaction mixture in the liquid phase and such that the liberated alcohol can be removed by fractionation batchwise or continuously.

In certain other cases it is difficult to react the desired unsaturated reacting agent with the alpha-hydroxy acid, estolide or dehydroxylated estolide owing to the relatively slow reaction or instability of the agent. In these instances it is often desirable to prepare the desired derivatives by a re-esterification process wherein the usual unsaturated reacting agent is replaced by the amide, ester or thio-ester of an unsaturated amine, alcohol or thio-alcohol respectively with a low molecular weight fatty acid such as formic acid, acetic acid, propionic acid, butyric acid or the like. Under such conditions the low molecular weight acyl radical of the modified unsaturated reacting agent is replaced with the acyl radical of an alpha-hydroxy acid, estolide, or dehydroxylated estolide to form the desired polymerizable derivatives. In carrying out the re-esterification reaction, catalysts may be employed if desired such as any of the acidic, neutral or alkaline catalysts mentioned hereinbefore in connection with the exchange process. The desired temperature for the reaction is generally between about 100 and 250° C. and a suitable pressure is employed to maintain the reaction in the liquid state. This method for preparing unsaturated derivatives is especially useful for preparing derivatives of unsaturated compounds which are normally difficult to prepare due to the relative inertness of the unsaturated reacting agent or due to the fact that the free unsaturated reacting agent is difficult to prepare in the free state.

Perhaps this invention can best be understood by reference to the following specific examples:

*Example I*

About 8600 parts by weight of a refined petroleum wax, having a melting point between 145° F. and 155° F., were introduced into an oxidation vessel provided with heating and cooling coils. The wax was melted and the temperature increased to about 265° F., at a pressure of about 75 to 80 pounds per square inch gauge. Air was employed as the oxidizing agent and was passed through the oxidation vessel at a rate of 5.5 cubic feet per barrel per minute. At the end of about 24 hours, the oxidation reaction had begun to progress satisfactorily and the temperature was lowered to 250° F. The course of the reaction is illustrated by reference to the following table showing the acid number of the wax being oxidized at various times during the reaction:

| Time, Hours: | Acid No. |
|---|---|
| 12 | Neutral |
| 24 | 1.4 |
| 30 | 12.6 |
| 36 | 36.0 |
| 48 | 70.6 |
| 60 | 108.1 |
| 72 | 131.6 |
| 90 | 154.0 |
| 120 | 206.0 |
| 132 | 250.0 |

During this particular oxidation, quantities of partially oxidized wax were withdrawn at two different intervals during the run, 680 parts by weight of 36 acid number wax and 1690 parts by weight of 102 acid number wax being withdrawn, leaving 4560 parts by weight of a wax oxidate which was oxidized to an acid number of 250. The latter wax oxidate having an acid number of 250 contains considerable amounts of useful low molecular weight water-soluble organic acids which appear to be a mixture of fatty acids, hydroxy acids and dicarboxylic acids, and these compounds were removed by extraction with between 5 and 10 volumes of hot water of about 100° C.

About 1000 parts by weight of the water washed 250 acid number wax oxidate was subjected to the fractionation process using the borax method. This amount of wax oxidate was mixed with 1650 parts by weight of a 9.1 per cent by weight solution of sodium borate at a temperature of about 70° C. The mixture thus formed was then extracted three times with 1500 parts by weight of a light gasoline at a temperature of 70° C. and the resulting hydrocarbon and aqueous phases separated. The aqueous borax-soap-complex phase was subsequently heated to about 95° C. to evaporate the gasoline dissolved in the extraction step. The aqueous soap-complex phase was subsequently acidified with 69.5 parts by weight of 42% sulfuric acid whereby the alpha-hydroxy acids and estolides of alpha-hydroxy acids were separated. The separated alpha-hydroxy acid-estolide fraction was water washed to remove the inorganic acids and salts. The purified estolide-alpha hydroxy acid fraction thereby produced contained about 5 per cent by weight of dissolved water.

The hydrocarbon or gasoline phase of hydrocarbon-soluble acids obtained in the extraction step was subjected to a further extraction with 192 parts by weight of a 13 per cent by weight solution of sodium borate in water at a temperature of 70° C. thereby forming a soap complex with the small amount of remaining alpha-hydroxy acids and estolides which were not retained in sodium borate solution during the extraction with light gasoline. The borax-soap-complex phase was separated and was acidified with 42 per cent sulfuric acid to separate a crude alpha-hydroxy acid-estolide fraction. The hydrocarbon phase was subsequently extracted with 1670 parts by weight of a 5% by weight solution of sodium carbonate, thereby forming the water-soluble sodium soaps of the gasoline-soluble acids present. The aqueous sodium carbonate phase was subsequently separated and heated to about 95° C. to remove residual gasoline dissolved in the extraction step. The carbonate solution was then acidified with one equivalent of 42 per cent sulfuric acid per equivalent of gasoline-soluble soap. The gasoline-soluble acids present as their sodium soaps are liberated as the acids and were water washed. This fraction comprises the purified fatty acids from the oxidized wax. The carbonate-water-washed hydrocarbon phase containing the neutral bodies was distilled to recover gasoline therefrom. The residual neutral product obtained thereby was practically free of acids.

The following table indicates per cent recovery of each of the fractions based on the water washed oxidized wax, and the characteristics of each of the acid fractions obtained therefrom:

| | Weight Percent Yields a (Approx.) | Approximate Analysis | | |
|---|---|---|---|---|
| | | Acid No. | Sap. No. | Percent Neutrals |
| Alpha-hydroxy acids and Estolides | 48 | 207 | 349 | 3.0 |
| Naphtha-Soluble Fatty Acids | 36.4 | 160 | 225 | 3.0 |
| Neutral Compounds | 15.6 | 4 | 87 | | a Based upon the water-washed, 250 acid-number wax oxidate.

Example II

A portion of the oxidized wax prepared in Example I having an acid number of about 250, was water washed three times with about 10 volumes of hot water at 100° C. in order to remove the water-soluble constituents. A portion of the water washed oxidized wax amounting to 1000 parts by weight was slurried with about 10 volumes of light gasoline having a boiling range of 50 to 85° C. in order to remove the hydrocarbon-soluble material. The amber-colored, hydrocarbon-insoluble phase was twice extracted with a total of about 10 volumes of the light gasoline after which the insoluble phase was heated to about 95° C. to evaporate the light gasoline therefrom. The hydrocarbon-insoluble material amounted to 540 parts by weight, corresponding to a yield of 54% based on the water washed oxidate. The composition of the hydrocarbon-insoluble fraction was as follows:

| Components | Mole Percent of Total |
|---|---|
| Alpha-hydroxy acids | 23.5 |
| Estolides | 52 |
| Fatty Acids | 13.5 |
| Neutral Compounds | 11 |

Example III

About 400 parts by weight of the purified alpha-hydroxy acid-estolide fraction obtained in Example I, 200 parts by weight of potassium hydroxide, 200 parts by weight of water, 160 parts by weight of ethyl alcohol were introduced into a flask which was fitted with a gas trap and the mixture was heated and maintained at 90° C. for approximately 4½ hours. At the end of this time no volatile gases have been evolved by the reaction mixture. The saponified mixture was then diluted with 2000 parts by weight of water and subsequently acidified to a pH of 3, with 10% sulfuric acid. During the acidification, the solution was vigorously agitated with air and the acid was added slowly and in such a way that the contact of the liberated acids with the strong mineral acid being added was minimized. The acidified mixture was then extracted with about 800 parts by weight of peroxide-free ether, water washed and dried and the ether then removed by evaporation. About 368 parts by weight of amber-colored enriched alpha-hydroxy acids were obtained therefrom, corresponding to a yield of 92 per cent by weight based on the original mixture of alpha-hydroxy acids and estolides. Analysis of the saponification feed stock and product showed that, on a neutral oil fatty acid-free basis, the feed stock contained 72 mole per cent estolides and 28 mole per cent alpha-hydroxy acids, whereas the saponification product contained 11 mole per cent estolides and 89 mole per cent of alpha-hydroxy acids.

Example IV

About 100 parts by weight of the dry purified alpha-hydroxy acid-estolide mixture (approximately 28 mole per cent alpha-hydroxy acids) obtained in Example I and 45 parts by weight of refined xylenes were placed in a flask fitted with a reflux condenser and a water trap such that any water formed in the flask could be azeotroped overhead with the xylene, separated from the distillate by gravity into the water trap, collected and measured. The reaction mixture was refluxed for about 19 hours while the contents of the flask were maintained at about 150° C. The amount of water collected in the water trap corresponded to a theoretical conversion of the alpha-hydroxy acids to the estolide. The acid number and saponification number were determined on the reaction product and these data confirmed the fact that the estolide had been formed. The amount of side reaction leading to the dehydroxylation of the estolide was found to be about 5 mole per cent. A portion of the reaction product was evaporated to remove the xylene whereupon a light brown-colored estolide fraction was obtained.

Example V

About 100 parts by weight of purified alpha-hydroxy acids and estolides prepared according to the method described in Example I, 10 parts by weight of refined xylenes, and 21 parts by weight of allyl amine are placed in a closed stainless steel vessel and heated to a temperature of about 175 to 185° C. After about one hour the reaction vessel is cooled to room temperature by circulation of cooling water through the jacket. The product obtained thereby is a slightly viscous homogeneous liquid. About 10 parts by weight of the reaction product are mixed with about 90 parts by weight of refined xylenes and the resulting solution is mixed with about 1% by weight of a cobalt naphthenate drying oil catalyst containing about 6% by weight of cobalt metal. Aluminum metal strips are dipped into the solution, drained and dried at 40° for one hour. A hard, tough film remains on the metal strip.

Substantially the same favorable results are obtained when about 100 parts by weight of the less pure alpha-hydroxy acids and estolides prepared according to the method described in Example II are substituted for the purified alpha-hydroxy acids. The film which is formed is somewhat less durable and requires a longer period of drying.

Example VI

About 100 parts by weight of purified alpha-hydroxy acids and estolides prepared according to the method described in Example I, 50 parts by weight of refined xylenes and 22 parts by weight of allyl alcohol are placed in a closed stainless steel autoclave and maintained at a reaction temperature of about 150° C. for 3 hours. The reaction product is a smooth homogeneous liquid of a light-brown color. Polished aluminum strips are dipped into the reaction product and dried for 4 hours at a temperature of 100° in air. A hard, firm coating on the metal surface is produced thereby. When the reaction product is diluted with an equal volume of refined xylenes and the resulting solution is mixed with about 0.05% by weight of a cobalt naphthenate drying catalyst containing 6% by weight of cobalt there is produced a drying composition which, when painted on aluminum or iron metal strips, forms a hard coating thereon. A similar coating is produced by applying the drying solution to raw wooden panels. Similar results are obtained when about 28 parts by weight of allyl mercaptan is substituted for the allyl alcohol in the foregoing preparation and testing.

Example VII

About 100 parts by weight of the purified and enriched alpha-hydroxy acids prepared according to the method described in Example III, 10 parts by weight of refined xylenes, and 45 parts by weight of para-aminostyrene are placed in a stainless steel autoclave and maintained at a temperature of 190° C. for 45 minutes. The cooled reaction mixture is a viscous homogeneous liquid. When the reaction mixture is mixed with about 3 volumes of refined xylenes, the mixture painted onto steel panels and the panels dried at a temperature of 60° C. for 24 hours, a tough coating firmly bonded to the metal remains on the panels. Substantially the same results are obtained when 45 parts by weight of para-hydroxystyrene or when 50 parts by weight of ortho-thio-hydroxystyrene is substituted for the para-aminostyrene in the foregoing preparation.

*Example VIII*

About 100 parts by weight of the enriched estolide-containing mixture prepared according to the method described in Example IV are dissolved in about 50 parts by weight of an aromatic hydrocarbon fraction boiling in the range of about 160 to 185° C. The resulting hydrocarbon solution is placed in a flask fitted with a reflux condenser and a water trap. The mixture was maintained at a temperature of about 200° C. in order to maintain a reflux. After about 30 hours of refluxing the water in the trap corresponded to about 50% dehydroxylation of the estolide. About 27 parts by weight of crotyl amine are added to the dehydroxylated estolide-containing mixture along with about 45 parts by weight of toluene. The mixture was refluxed at a temperature of about 125° C. for a period of about 24 hours. The completion of the reaction of the crotyl amine with the estolide and dehydroxylated estolide-containing mixture was estimated to be 80% complete. The reaction product was mixed with about 0.01% by weight of a cobalt naphthenate drying catalyst and when tested according to the method described in Example I is found to possess good drying properties. Substantially the same favorable results are obtained when about 28 parts by weight of crotyl alcohol is substituted for the crotyl amine with the exception that the reaction periods are increased about 50%.

*Example IX*

About 100 parts by weight of the mixture of alpha-hydroxy acids and estolides prepared according to the method described in Example I, about 45 parts by weight of benzene, and about 100 parts by weight of absolute ethyl alcohol are placed in an autoclave and heated to a temperature of 150° C. for a period of 4 hours. The reaction mixture is then cooled, depressured and heated to a temperature to flash off the larger part of the ethyl alcohol and benzene present, thereby removing the water formed in the reaction. An additional 100 parts of absolute ethyl alcohol are added to the residue and again heated in the autoclave for four hours. The resulting product after removal of the ethyl alcohol is substantially completely esterified. The esterified residue is transferred to a distillation flask fitted with a small fractionating column. About 50 parts by weight of allyl alcohol and about 1 part by weight of a sodium methylate catalyst are added to the flask. The mixture is then refluxed and the ethyl alcohol distilling to the top of the column is removed as it is formed. After about 15 hours of refluxing, substantially all of the ethyl alcohol has been removed and the temperature is raised to flash off the excess allyl alcohol. The product remaining in the flask is a clear homogeneous liquid which is readily polymerized by heating to 150° C. in the presence of 0.5% by weight of cumene hydroperoxide. When about 50 parts by weight of propargyl alcohol is substituted for the allyl alcohol in the foregoing experiment, substantially the same favorable results are obtained. Similarly, methyl alcohol may be employed in place of the ethyl alcohol.

*Example X*

About 100 parts by weight of the substantially pure alpha-hydroxy acids prepared according to the method described in Example III, about 500 parts by weight of methanol, 50 parts by weight of benzene, 5 parts by weight of benzene sulfonic acid are placed in a flask and maintained at a temperature of about 65° C. for about 24 hours. The methanol is removed from the mixture by distillation and about 100 parts by weight of benzene is added to the residue. About 50 g. of 1,2,3,6-tetrahydro pyridine are added to the benzene solution containing the methyl ester of the alpha-hydroxy acid and the resulting mixture is placed in a distillation flask fitted with a small fractionating column. After about 20 hours of refluxing the theoretical amount of methyl alcohol is removed from the top of the fractionation column and the liquid residue in the flask is washed several times with a 5% by weight solution of sodium carbonate in water to remove the benzene sulfonic acid catalyst. The benzene solvent and excess amine are evaporated from the washed product leaving a clear liquid which is readily polymerized by heating to 150° C. with about 0.01% of benzoyl peroxide.

*Example XI*

About 100 parts by weight of the enriched estolide-containing mixture prepared according to the method described in Example IV, about 50 parts by weight of xylenes and 2 parts by weight of zinc chloride are placed in a flask fitted with a reflux condenser and a water trap. The mixture is refluxed at a temperature of about 145° C. for about 25 hours. The product is roughly a 50-50 mixture of estolides and dehydroxylated estolides. The solution is then placed in a distillation flask fitted with a fractionation column and 60 parts by weight of ortho-vinyl-phenyl acetate are added. The mixture is refluxed for about 70 hours and the acetic acid is gradually removed from the top of the column. The ortho-vinyl-phenyl ester of the estolides and dehydroxylated estolides in xylene solution is removed from the distillation flask, the solvent evaporated off and the ortho-vinyl-phenyl esters polymerized by heating in the absence of air to 220° C. for 2 hours. A plastic mass is obtained thereby. Substantially the same favorable results can be obtained by substituting about 110 parts by weight of geraniol propionate for the ortho-vinyl-phenyl acetate.

The foregoing disclosure of our invention is not to be considered as limiting since many variations may be made by those skilled in the art without departing from the spirit and scope of the following claims.

We claim:

1. A polymerizable derivative comprising the reaction product obtained by heating a mixture of at least one carboxylic acid selected from the class consisting of water-insoluble alpha-hydroxy acids containing from 5 to 30 carbon atoms per molecule, water-insoluble estolides of alpha-hydroxy acids containing from 10 to 60 carbon atoms per molecule and dehydroxylated estolides of alpha-hydroxy acids containing from 10 to 60 carbon atoms per molecule, between 1 and 2 stoichiometric equivalents of an unsaturated compound having the formula:

$$R_nX(H)_m$$

wherein R is an unsaturated hydrocarbon radical containing between 3 and 20 carbon atoms, X is an atom selected from the group consisting of oxygen, sulfur and nitrogen, H is hydrogen, and $n$ and $m$ are whole numbers greater than 0 and less than 3 and the sum of $n$ and $m$ is equal to the valence of X, and between 0.05 and 5 moles per mole of carboxylic acid of a non-gelation agent of the class consisting of organic carboxylic acid having a conjugated diene grouping, esters of such organic acids, and unsaturated hydrocarbons of the class consisting of styrene, alpha methyl styrene, isoprene butadiene, pentadiene and cyclopentadiene, at a temperature between 150° C and 200° C. sufficient to effect at least partial esterification and dehydroxylation of said carboxylic acid and removing water formed during the heating.

2. A polymerizable derivative according to claim 1 in which said non-gelation agent is rosin.

3. A polymerizable derivative according to claim 1 in which said unsaturated compound is allyl alcohol.

4. A polymerizable derivative according to claim 1 in which unsaturated compound is allyl amine.

5. A process for the production of polymerizable derivatives which comprises reacting, at temperatures between 150° C. and 200° C., between 1 and 2 stoichiometric equivalents of an unsaturated compound having the formula:

$$R_nX(H)_m$$

wherein R is an unsaturated hydrocarbon radical containing between 3 and 20 carbon atoms, X is an atom selected from the group consisting of oxygen, sulfur and nitrogen, H is hydrogen, and $n$ and $m$ are whole numbers greater than 0 and less than 3 and the sum of $n$ and $m$ is equal to the valence of X, with a mixture of water-insoluble alpha-hydroxy carboxylic acids containing from 5 to 30 carbon atoms per molecule, water-insoluble estolides of alpha-hydroxy carboxylic acids containing 10 to 60 carbon atoms per molecule and dehydroxylated estolides of alpha-hydroxy acids containing from 10 to 60 carbon atoms per molecule in the presence of 0.05 to 5 moles of rosin and removing water formed during the reaction, said temperatures being sufficient to effect at least partial esterification and dehydroxylation of said alpha-hydroxy acids and estolides.

6. A process according to claim 5 in which said unsaturated compound is allyl alcohol and the reaction is effected under pressure sufficient to maintain at least part of the allyl alcohol in the liquid phase.

7. A process according to claim 5 in which said reaction is effected in the presence of between about 0.1% to 5% by weight of an acid catalyst selected from the group consisting of benzene sulfonic acid, toluene sulfonic acid, naphthalene sulfonic acid, sulfuric acid, chlorosulfonic acid, boric acid and phosphoric acid and the reaction is effected at a temperature between 100° C. and 150° C.

8. A process for the production of polymerizable derivatives which comprises reacting at temperatures between 150° C. and 200° C. between 1 and 2 stoichiometric equivalents of allyl alcohol with 1 stoichiometric equivalent of a mixture of water-insoluble alpha-hydroxy carboxylic acids containing from about 5 to 30 carbon atoms per molecule and water-insoluble estolides of alpha-hydroxy carboxylic acids containing 10 to 60 carbon atoms per molecule in the presence of 0.05 to 5 mols of rosin and removing water formed during the reaction, said temperatures being sufficient to effect at least partial esterification and dehydroxylation of said alpha-hydroxy acids and estolides.

9. A process for the production of polymerizable derivatives which comprises reacting at temperatures between 150° C. and 200° C. between 1 and 2 stoichiometric equivalents of allyl amine with 1 stoichiometric equivalent of a mixture of water-insoluble alpha-hydroxy carboxylic acids containing from about 5 to 30 carbon atoms per molecule and water-insoluble estolides of alpha-hydroxy acids containing 10 to 60 carbon atoms per molecule in the presence of 0.05 to 5 mols of rosin and removing water formed during the reaction, said temperatures being sufficient to effect at least partial esterification and dehydroxylation of alpha-hydroxy acids and estolides.

10. A process for the production of polymerizable derivatives which comprises reacting at temperatures between 150° C. and 200° C. between 1 and 2 stoichiometric equivalents of allyl alcohol with 1 stoichiometric equivalent of a mixture of water-insoluble alpha-hydroxy carboxylic acids containing from about 5 to 30 carbon atoms per molecule and water-insoluble estolides of alpha-hydroxy carboxylic acids containing 10 to 60 carbon atoms per molecule in the presence of 0.05 to 5 mols of styrene and removing water formed during the reaction, said temperatures being sufficient to effect at least partial esterification and dehydroxylation of said alpha-hydroxy acids and estolides.

References Cited in the file of this patent

UNITED STATES PATENTS

| Number | Name | Date |
|---|---|---|
| 2,164,188 | Groll | June 27, 1939 |
| 2,273,891 | Pollak et al. | Feb. 24, 1942 |
| 2,371,235 | Gardner | Mar. 13, 1945 |
| 2,374,081 | Dean | Apr. 17, 1945 |
| 2,376,504 | Pfann | May 22, 1945 |
| 2,400,873 | Bruson | May 28, 1946 |
| 2,410,740 | Jones | Nov. 5, 1946 |
| 2,443,915 | Jones | June 22, 1948 |
| 2,464,741 | Adelson et al. | Mar. 15, 1949 |
| 2,534,255 | Filachione | Dec. 19, 1950 |

FOREIGN PATENTS

| Number | Country | Date |
|---|---|---|
| 600,653 | Great Britain | Apr. 15, 1948 |

OTHER REFERENCES

Nagel: Berichte, vol. 70 (1937), pp. 2173-9.